US005290391A

United States Patent [19]

Czech et al.

[11] Patent Number: 5,290,391

[45] Date of Patent: Mar. 1, 1994

[54] APPARATUS AND METHOD FOR ATTACHING ARTICLES TO A PLASTIC BAG WALL

[75] Inventors: Norberto Czech; Robert Lauzon, both of Montreal, Canada

[73] Assignee: Glopak Inc., Montreal, Canada

[21] Appl. No.: 969,371

[22] Filed: Oct. 30, 1992

[51] Int. Cl.[5] .............................................. B32B 31/00

[52] U.S. Cl. .................................... 156/566; 156/383; 156/552; 156/571; 156/DIG. 31; 53/450

[58] Field of Search ............... 156/566, 571, DIG. 31, 156/70, 290, 292, 383, 538, 552, 519, 520, 497; 53/449, 450; 100/163 R, 164, 165, 169

[56] References Cited

U.S. PATENT DOCUMENTS

| | | | |
|---|---|---|---|
| 3,871,943 | 3/1975 | Zodrow | 156/521 |
| 4,268,344 | 5/1981 | Jones | 156/383 |
| 4,425,181 | 1/1984 | Bahr et al. | 156/497 |
| 4,865,679 | 9/1989 | Gamberini et al. | 156/DIG. 31 X |
| 5,015,326 | 5/1991 | Frank | 156/523 X |

*Primary Examiner*—David A. Simmons
*Assistant Examiner*—James J. Engel, Jr.
*Attorney, Agent, or Firm*—Oblon, Spivak, McClelland, Maier & Neustadt

[57] ABSTRACT

An apparatus and a method for attaching articles to a plastic bag wall and particularly for attaching flat articles, such as coupons, cards, packets, samples, etc., to an inside wall of a panel of the bag and at different locations thereon. The articles are attached by feeding a bag-forming film sheet of plastic material to an article insertion station where the plastic sheet passes about a nip roll. An article transfer mechanism transfers articles from a discharge end of one or more supply magazines to two or more support surfaces at an article insertion station. These support surfaces are aligned with distinct sections of the bag-forming film sheet. An attaching film sheet is fed over a support roll which is in frictional rotational contact with the nip roll with the attaching film sheet aligned over the distinct sections of the bag-forming film sheet. The nip roll is moved in the direction towards the support surface to grasp a leading edge of an article positioned on the support surface to position same between the bag-forming film sheet and the attaching film sheet along the distinct sections. The two sheets are then sealed together with the article captive therebetween. The composite film can then be fed to a bag-forming station.

15 Claims, 7 Drawing Sheets

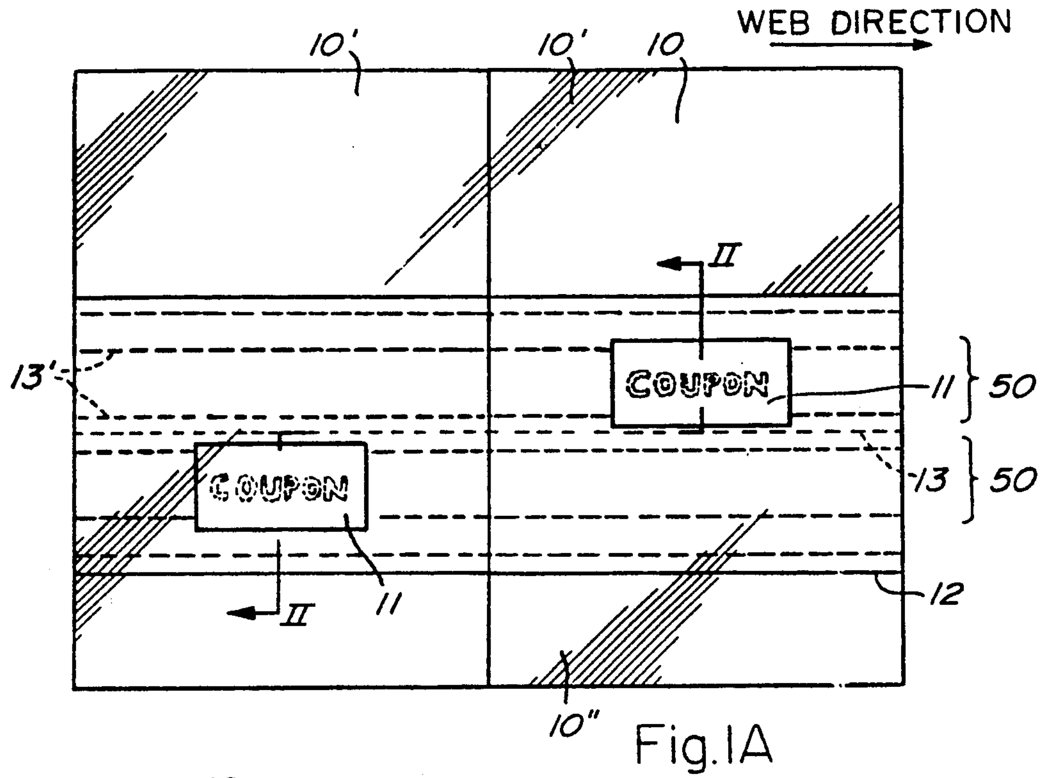
Fig.1A
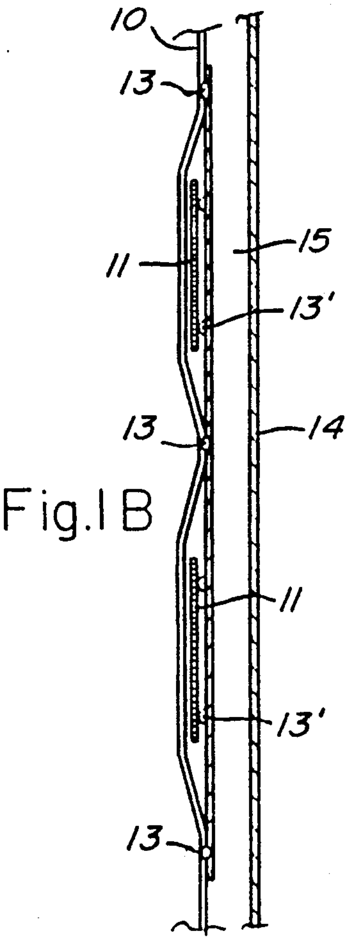
Fig.1B
Fig.2A
(PRIOR ART)
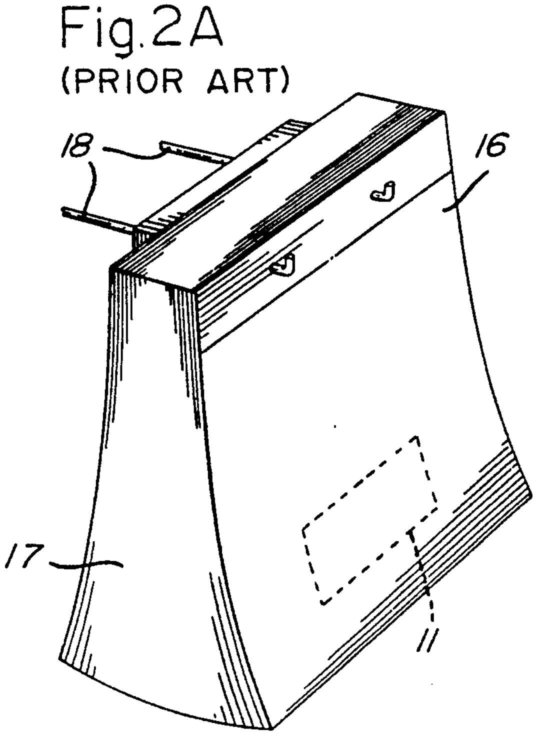

APPARATUS AND METHOD FOR ATTACHING ARTICLES TO A PLASTIC BAG WALL

TECHNICAL FIELD

The present invention relates to an apparatus and a method for attaching flat articles, such as coupons, cards or flat packets, at different positions on a side wall of a bag so that more bags can be held on wicket pins in a bag-loading apparatus and form a more uniform stack of bags. The invention also contemplates a bundle of substantially uniform density formed by a plurality of such plastic bags disposed in alternating sequence therein.

BACKGROUND ART

In U.S. Pat. No. 4,268,344 issued May 19, 1981, there is described a method and an apparatus for positioning and securing a coupon within a transparent plastic bag. This coupon is positioned on the bag-forming film sheet and attached thereto by placing an attaching film sheet over the coupon and sealing both sheets together so that the coupon is retained in an immovable position on an inside wall of the bag which is later formed. These coupons are positioned at a common precise position on the bag. We have found that by doing this, there results certain inconveniences. One of these inconveniences is that when the bags are formed to be later supported and attached on wicket pins of a bag-loading machine, the area where the bag has the coupon bulges out and causes an enlargement and deformation of the stack of bags positioned on the wicket pins. This deformation of the stack causes problems in handling the bags in a bag-loading machine. In an attempt to resolve this problem, fewer bags are positioned on the wicket pins. This means that the machine must be stopped more frequently to reload the wicket pins or to correct a malfunction caused by the bulging out of the stack of bags.

Another inconvenience of the above-mentioned prior art bags provided with coupons is that the machine for inserting the coupon is very slow and only between 70 to 80 coupons can be secured to the film every minute. This is caused by the fact that the transfer of coupons is done mechanically in a reciprocating transverse manner.

With the above-mentioned prior art machine, it is only possible to affix a single coupon to a bag wall. There is, however, a need to insert two or more coupons or cards to the same wall of a bag or to affix two flat articles which are different from one another and positioned side by side in a non-interfering manner.

SUMMARY OF INVENTION

It is a feature of the present invention to provide an apparatus and a method for attaching flat articles, cards, packets or the like to a plastic bag wall and which substantially overcomes the above-mentioned disadvantages of the prior art.

Another feature of the present invention is to provide an apparatus and a method for attaching flat articles, cards, packets or the like to a plastic bag wall and wherein the flat articles or packets are positioned in a staggered, non-interfering relationship on alternating bag-forming sections of a film sheet so that when a plurality of bags are formed and suspended on wicket pins, such as in a bag-loading machine, the bags form a substantially uniform stack resulting in more bags being supported on the wicket pins than with prior art bags and fewer malfunctions and machine stoppages.

Another feature of the present invention is to provide an apparatus and a method for attaching flat articles, cards, packets or the like to a plastic bag wall and wherein the article insertion machine inserts the articles in a staggered, alternating relationship and in an in-line manner with relation to the direction of travel of the bag-forming film sheet thereby substantially increasing the insertion speed of the articles, as compared with the above-mentioned prior art machine.

Another feature of the present invention is to provide an apparatus and a method for attaching flat articles, cards, packets or the like to a plastic bag wall at a speed of up to approximately 300 articles per minute and with a capability of being able to match the speed of displacement of the bag-forming film sheet of the insertion machine.

Another feature of the present invention is to provide an apparatus and a method for attaching flat articles, cards, packets or the like to a plastic bag wall and wherein two different articles are attached to the bag wall and spaced from one another.

Another feature of the present invention is to provide a plastic bag bundle comprising a plurality of plastic bags each having article(s), such as coupons, cards, packets, etc. retained captive in a wall thereof and with the bags juxtaposed in alternating sequence wherein articles of alternating bags are offset to form a plastic bag bundle of substantially uniform thickness.

According to the above features, from a broad aspect, the present invention provides an apparatus for attaching flat articles, such as cards, coupons, packets, etc., to a plastic bag wall. The apparatus comprises a plurality of guide rolls and a nip roll for guiding and displacing a bag-forming plastic film sheet to an article insertion station. An article transfer mechanism, having article grasping means to grasp articles from a discharge end of a supply means transfers same to two or more article holding means at the article insertion station. The article holding means is aligned with distinct sections of the bag-forming film sheet. A further plurality of guide rolls is provided for guiding an attaching film sheet over a support roll positioned in frictional rotational contact against the nip roll and at the insertion station with the attaching film sheet aligned over the distinct sections of the bag-forming film sheet. Displaceable means is provided for causing relative displacement between the support roll and the nip roll in a direction towards the article holding means to grasp a leading edge of an article positioned on each holding means and position same between the bag-forming film sheet and the attaching film sheet along one of the distinct sections. Sealing means is provided to seal the bag-forming film sheet and the attaching film sheet together with the articles captive therebetween.

According to a still further broad aspect of the present invention, there is provided a method of attaching flat articles, such as cards, coupons, packets, etc., to a plastic bag wall. The method comprises feeding a bag-forming film sheet to a nip roll positioned at an article insertion station and in frictional rotational contact with a support roll over which an attaching film sheet is guided for facial contact with a specific area of the bag-forming film sheet. Articles are transferred from container means to each of two or more article holding means aligned with distinct sections of the bag-forming film sheet. The articles are supported on the holding means with a leading edge of the articles being placed at a grasping position. The nip roll is displaced on the grasping segment of the support roll in a direction towards the leading edge of the article to grasp the leading edge and pull the article between the bag-forming film sheet and the attaching film along an associated one of the distinct areas. The bag-forming film sheet and the attaching film are then sealed together with the articles captive therebetween.

According to a still further broad aspect of the present invention there is provided a method of attaching flat articles, such as coupons, cards, packets, etc., to a plastic bag wall. The method comprises displacing a bag-forming film sheet to an article insertion station. The articles are transferred in sequence from a supply means to two or more article holding means at the insertion station. The article holding means is aligned with distinct sections of the bag-forming film sheet. An attaching film sheet is guided and displaced over a support roll position in frictional rotational contact with a nip roll at the insertion station with the attaching film sheet aligned with the distinct sections of the bag-forming film sheet. The bag-forming film sheet is in frictional engagement with the nip roll. One of the flat articles is positioned in alternating sequence over the one or more article holding means. Relative displacement is effectuated between the nip roll and the support roll in a direction towards the two or more article holding means to grasp a leading edge of an article positioned on one of the holding means and to position same between the bag-forming film sheet and the attaching film sheet along one of the distinct sections. The article is then sealed captive between the bag-forming film sheet and the attaching film sheet.

BRIEF DESCRIPTION OF DRAWINGS

A preferred embodiment of the present invention will now be described with reference to the accompanying drawings in which:

FIG. 1A is a plan view of the bag-forming film sheet illustrating two panels which will form two bags and wherein flat-like articles, such as coupons, are positioned on each bag-forming panel and at staggered precise locations and retained thereon by an attaching film sheet which is sealed with the bag-forming film sheet;

FIG. 1B is a section view along section lines II—II of FIG. 1A;

FIG. 2A is a perspective view showing a plurality of bags held on wicket pins and carrying a single coupon as inserted with prior art apparatus;

DESCRIPTION OF PREFERRED EMBODIMENTS

Figure 3:
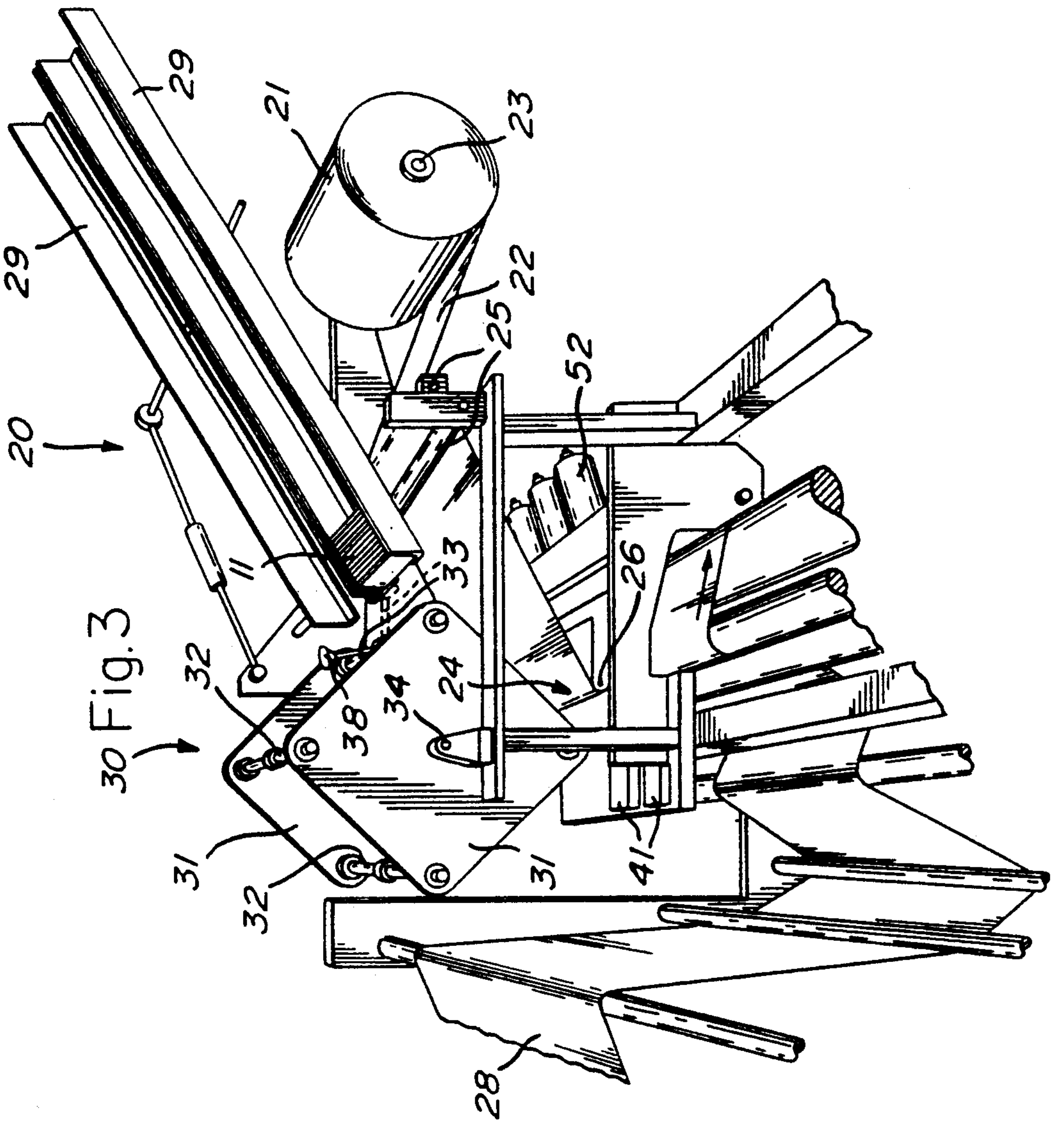
FIG. 3 is a perspective view of the apparatus of the present invention illustrating the manner in which the flat articles are transferred from supply magazines onto associated support surfaces for transfer between the bag-forming film sheet and the attaching film sheet.

Referring now to the drawings and more particularly to FIGS. 1A and 1B, there is shown a bag-forming film sheet 10 defining two bag-forming panels 10' and on each of which flat articles, such as cards, packets, coupons 11 or the like articles have been positioned and secured by an attaching film sheet 12 sealed thereover by a plurality of sealing lines 13 extending longitudinally along the long axis of the bag-forming film sheet 10. Two of the seal lines, namely seal lines 13', extend across the flat article, herein a coupon 11, to immovably retain the coupon between the bag-forming film sheet 10 and the attachment film sheet 12. The cross-section view of FIG. 1B clearly illustrates the manner in which the coupons are held in position. The panel sections 10" are then folded longitudinally and sealed together to form an adjacent side wall 14 of a bag. Accordingly, the coupons 11 are located inside the bag cavity 15, as shown in FIG. 2B.

Figure 2B:
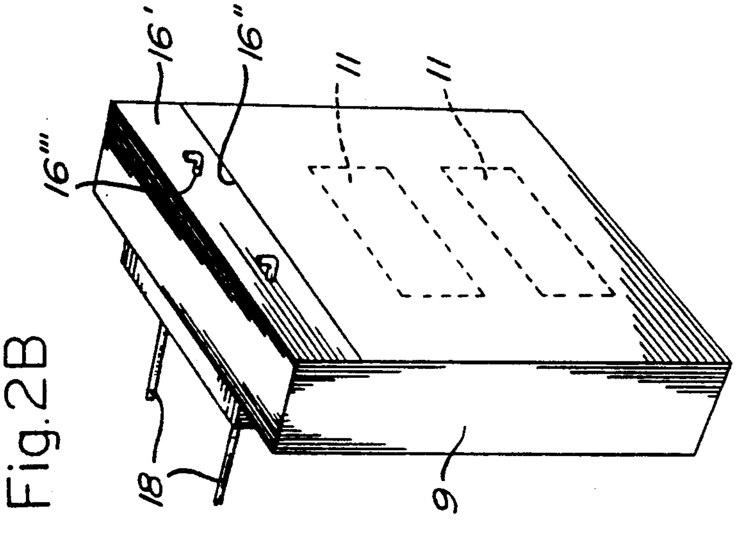
FIG. 2B is a perspective view similar to FIG. 2A but showing a stack of bags having staggered coupons secured thereto.

As shown in FIGS. 2A and 2B, the bags 16 formed by a prior art method, wherein coupons 11 are positioned at a common position, causes a stack of bags supported on wicket pins 18 to bulge out in the area 17 where the coupons are located as the bags are thicker in that area. This bulging out area 17 of the bags when stacked together causes may inconveniences and the end result is that fewer bags can be positioned on the wicket pins 18 which we find in most bag-loading machines. By staggering the coupons 11 at different alternating positions on the bags 10, a bundle 9 of uniform thickness is created and a greater number of bags can be held on the wicket pins, as shown in FIG. 2B. The bundle 9 does not form an enlarged or bulged-out area 17, as illustrated in FIG. 2B. Accordingly, many more bags can be held on the wicket pins 18, with fewer machine malfunctions resulting and fewer machine stoppages to reload.

Referring now additionally to FIGS. 1 to 7, there will be described the construction and operation of the coupon-insertion apparatus 20 of the present invention. As herein shown, in the apparatus, a roll 21 of a attaching film sheet 22 is held on a support rod 23 and guided to an article insertion station 24 by a plurality of guide rolls 25. At the insertion station 24, a nip roll 26 positions the attaching film sheet 22 against a support roll 27 on which a bag-forming film 28 is guided. This is better illustrated in FIG. 4 of the drawings.

Figure 4:
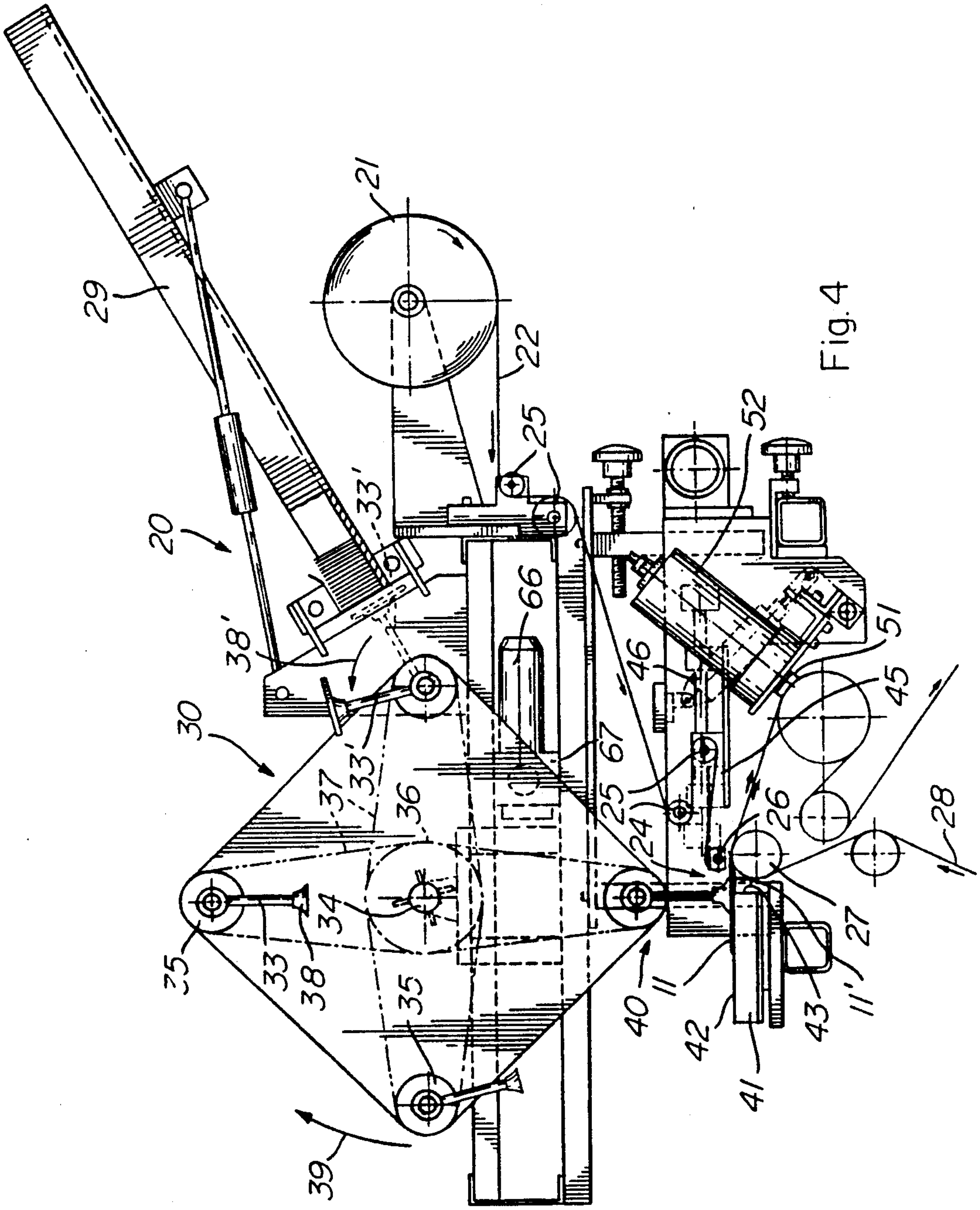
FIG. 4 is a side view illustrating the construction of the apparatus of the present invention and its operation.

In this particular embodiment, two cards or coupons 11, as shown in FIGS. 1A and 1B, are positioned on a side wall panel of the bag-forming film sheet. As previously described, these coupons are fed in-line with the bag-forming sheet 10 and this is made possible by the arrangement of the article transfer mechanism 30 which will now be described. The articles 11 are shown in FIGS. 3 and 4 as contained in two supply magazines 29 which are positioned side by side on top of the machine and supported at an inclined angle by frame members (not shown) and directed towards a discharge end. The article transfer mechanism 30 is a turret mechanism comprised of two spaced apart support walls 31 having transverse support rods 32 and on which is secured a suction grasping element 33. The entire mechanism is rotatable about a central axle 34 to which a planetary gear coupling is connected, as more clearly illustrated in FIG. 4. Planetary gears 35 are coupled to a drive gear 36 connected to the axle 34 and through chain links 37, the support rods 32 are caused to rotate counterclockwise so as to displace the suction grasping elements 33 about the support rods 32 to execute a transfer of articles 11 from the supply magazines 29. The suction grasping elements 33 are connected to a suction pump (not shown) whereby suction can be applied to the suction cup head 38 in a timed manner as dictated by the control circuit illustrated in FIG. 8.

Figure 6:
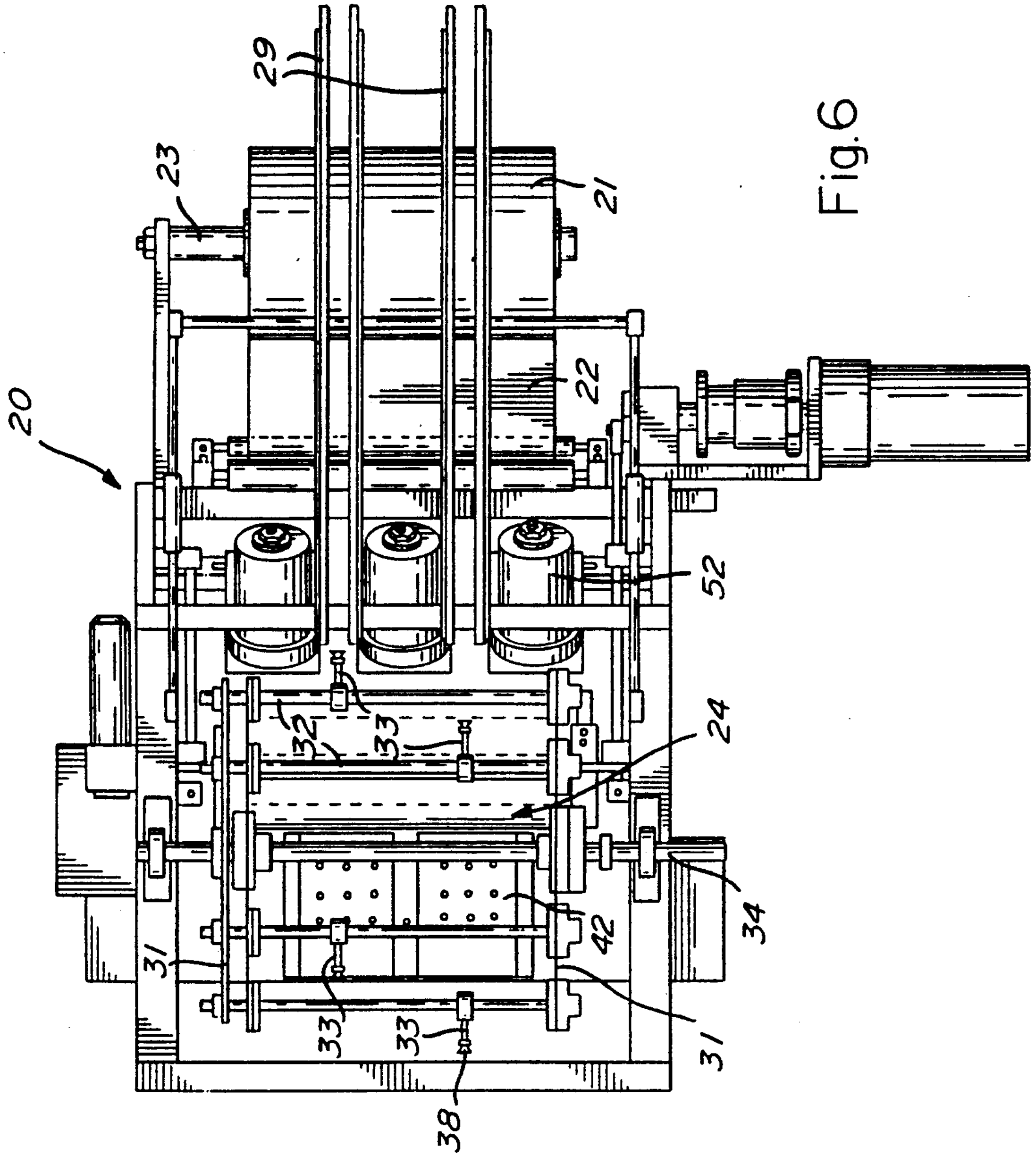
FIG. 6 is a view similar to FIG. 5 but illustrating the relationship of the supply magazines in relation to the support surfaces and sealing heads.

As shown in FIG. 6, the grasping elements on alternate support rods 32 are positioned offset from one another and aligned with a respective one of two support surfaces 42 or article holding means which are in turn aligned with distinct sections of the film sheet 22. When the suction element is at its position 33' (see FIG. 4), suction is applied to the suction head 38 and the outermost element 11 is grasped from the discharge end of one of the magazines 29. As the turret continues to rotate in a clockwise direction, as illustrated by arrow 39, the next suction element will grasp an article from the other magazine. The suction grasping elements 33 are displaced in a rotating counterclockwise manner, as shown by arrow 38', and the vacuum is maintained to rigidly retain the article 11 on the suction cup head 38 until it reaches its unloading position 40 where the cup head 38 is disposed vertically downward and over the support surface 42 of a vacuum chamber 41. The surface 42 is perforated to retain the elements 11 positioned thereover. Although the surface 42 herein described has a vacuum applied thereto, this may not be required due to the precise synchronism of the turret, film speed and grasping nip roll.

As shown in FIG. 4, the card-like article 11 is positioned with a leading edge 11' thereof extending over the side wall 43 of the suction box 41 and retained in this position by the continuous vacuum applied to the article 11 thereon. As soon as the article 11 is positioned on the support surface 42, it is retained by the suction applied to the surface 42. The suction from the suction cup head 38 is immediately cut off as the turret continues to rotate and all this is done within a split second. The leading edge 11' of the article 11 rests over a portion of the support roll 27 but is not drawn by the rotation of the bag-forming film sheet 28 as the suction in the suction box is greater than the friction force on the leading edge of the article 11.

Figure 7:
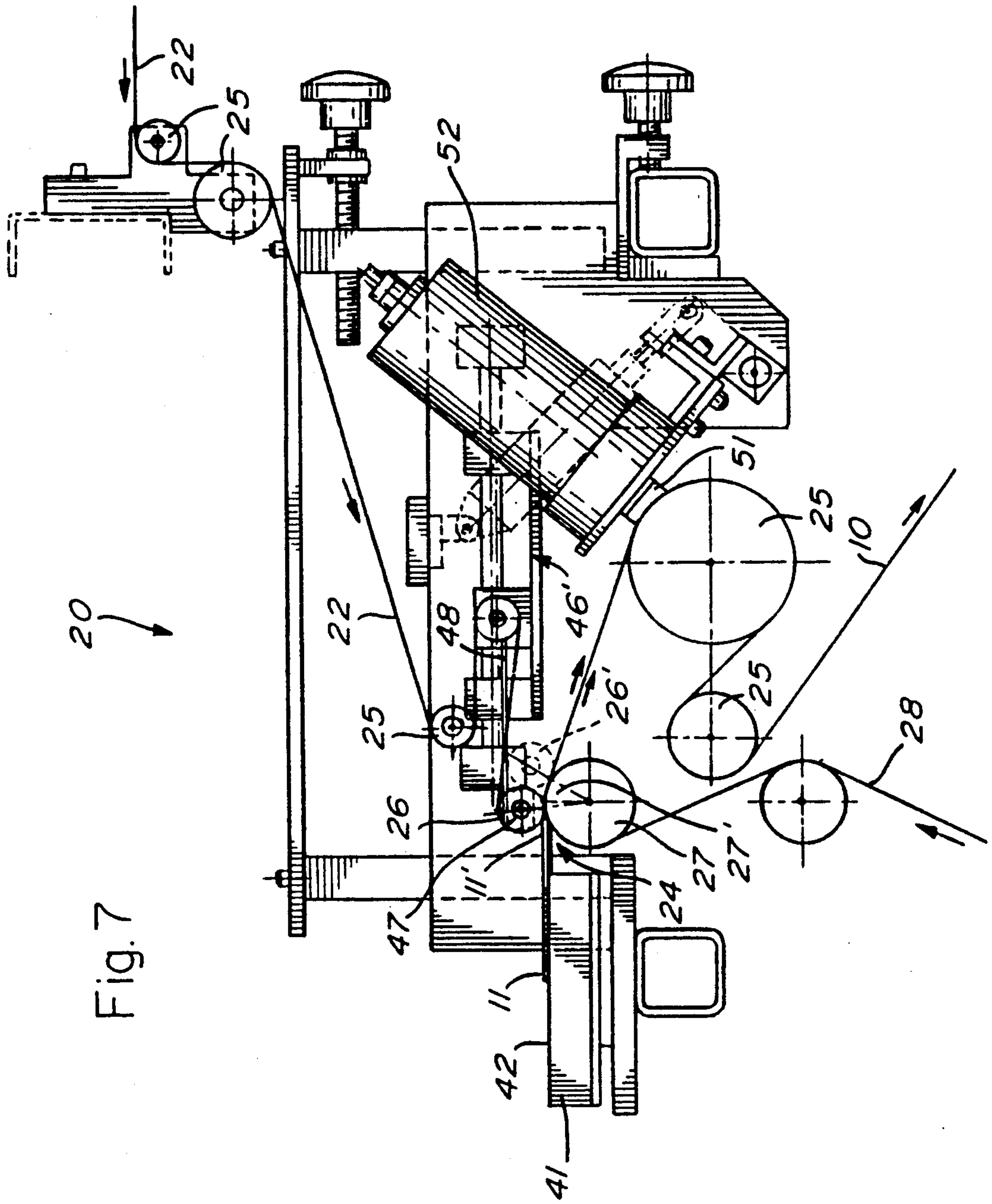
FIG. 7 is a schematic side view illustrating the relationship of the films with respect to the support surface and the manner in which the articles are grasped and fed between the bag-forming film sheet and the attaching film sheet.
Figure 8:
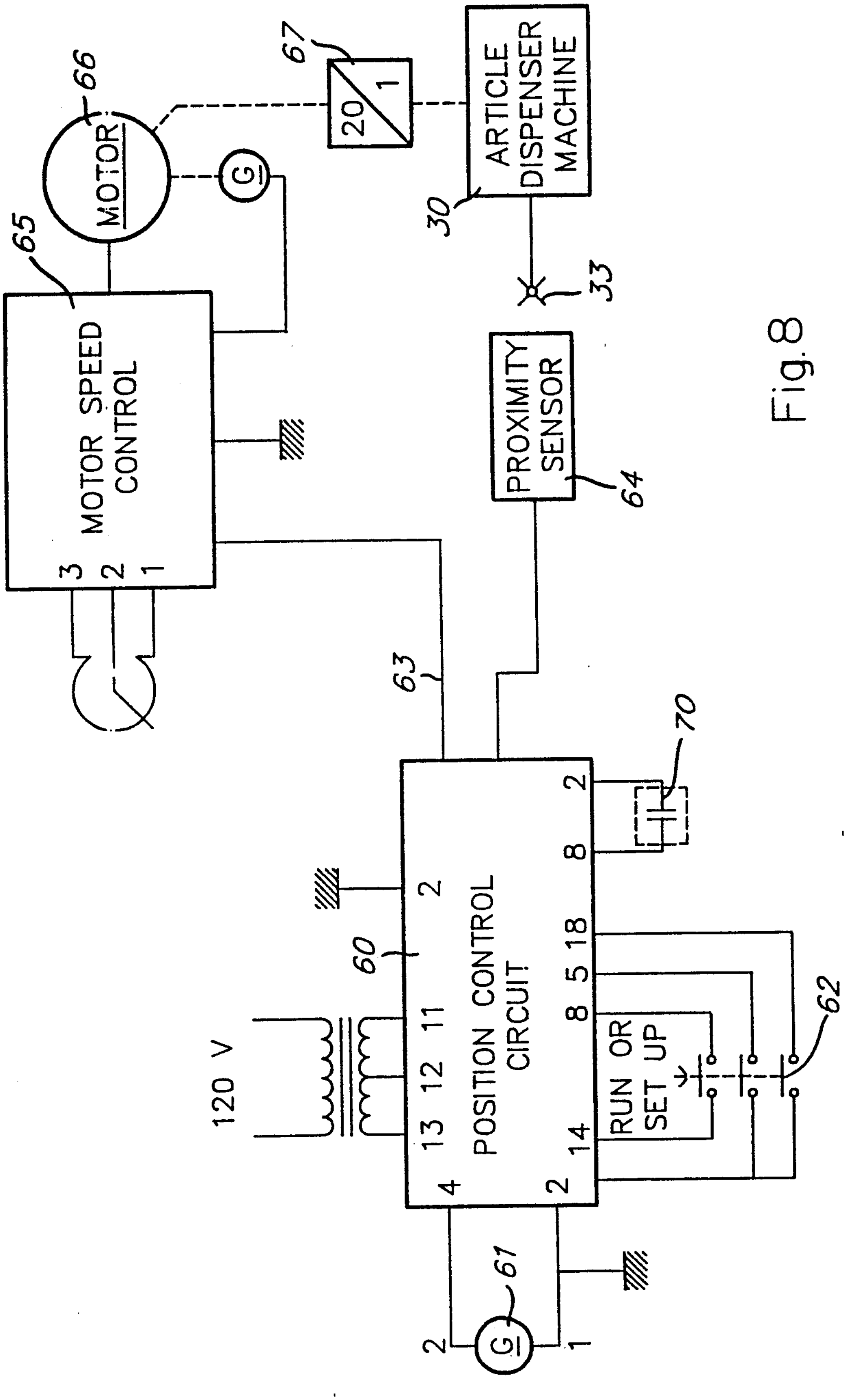
FIG. 8 is a block diagram showing the control system for the apparatus of the present invention.

Sensing means in the form of a photocell 70, as shown in FIG. 8, detects index markings on the bag-forming film sheet 28 and synchronizes the operation of the bag transfer mechanism 30, the suction box 41 and the operation of the nip roll 26. As shown in FIGS. 4 and 7, the nip roll 26 is secured to a support block 45 connected to a clutch mechanism 69 (see FIG. 5) and moves in a reciprocating manner to position the nip roll 26 from a non-grasping position 26' (see FIG. 7) to a grasping position as shown in FIGS. 4 and 7. The nip roll 26 is supported on an axle 47 which is secured at its opposed ends to flexible support arms 48 formed of spring steel. The nip roll 26 is aligned for frictional contact with the support block roll 27. By adjusting the angle of the support block 45, we can adjust the biasing pressure of the nip roll 26 against the support roll 27. As the nip roll is displaced from its position 26' (see FIG. 7) to its grasping position 26, it moves along a bag-grasping segment 27' of the support roll 27 to grab the leading edge 11' of the article 11 and draw the article 11 off the surface 42 and position it between the bag-forming film sheet 28 and the attaching film sheet 22 at a precise location, as shown in FIG. 1A. There are two suction blocks and support surfaces 42 positioned side by side, as shown in FIG. 5, and aligned with distinct areas or sections 50 of the bag-forming film sheet 28, as shown in FIG. 1A.

Figure 5:
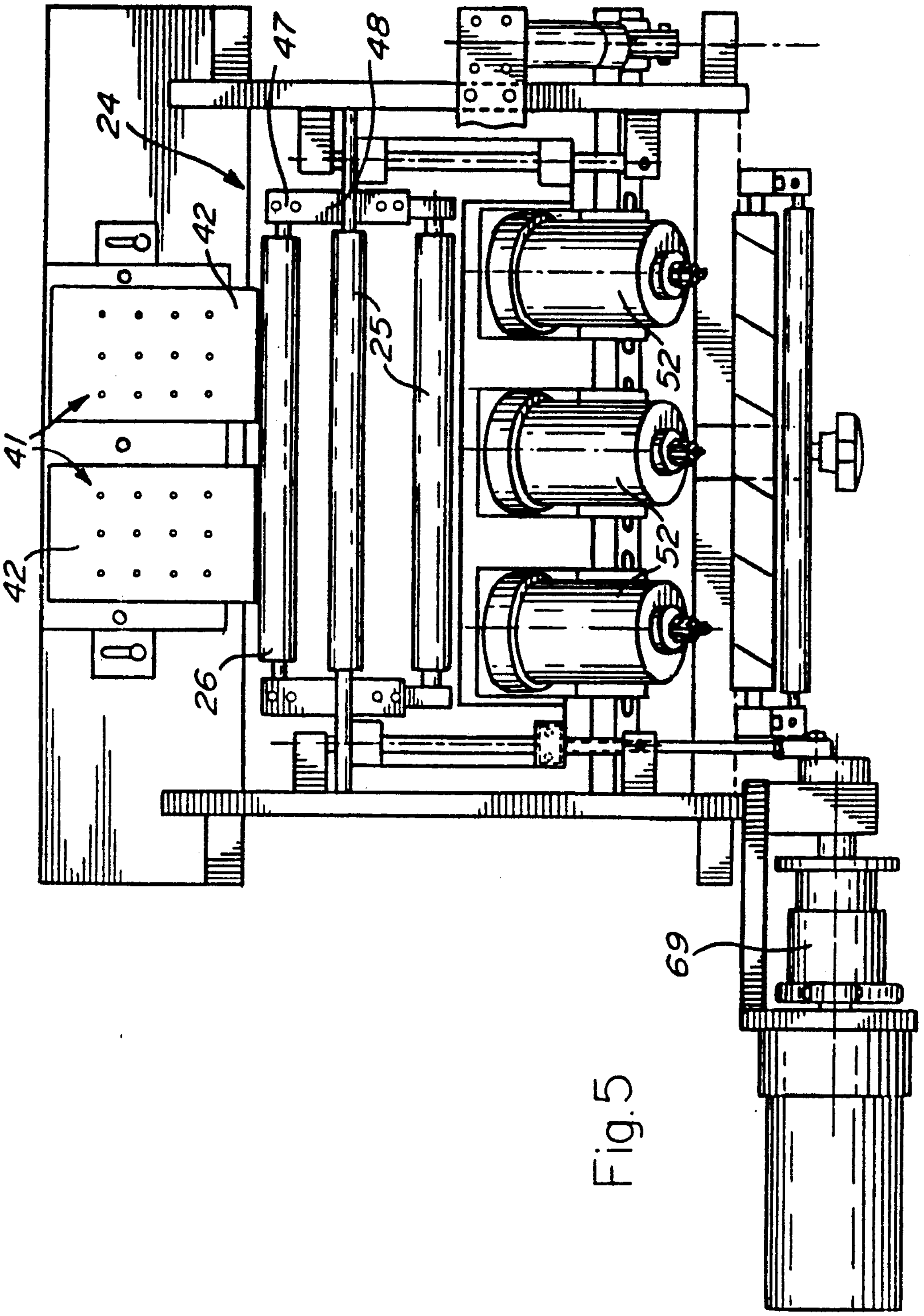
FIG. 5 is an end view showing the position of the support surfaces and their relationship with the sealing heads.

As more clearly illustrated in FIGS. 5 and 6, both film sheets 22 and 28 having the articles 11 held by friction therebetween, are then fed to a sealing station where hot air sealing heads 51 of each sealing device 52 apply fusing lines 13 and 13' to seal the attaching film sheet 22 to the bag-forming film sheet 28 and at the same time secure the article or coupons 11 therebetween. The composite bag-forming film sheet 10 is then fed to a bag-forming station (not shown) where bags are formed from the panels 10', as illustrated in FIG. 1B.

Referring now to FIG. 8, there is schematically illustrated the control system which is integrated with the apparatus 20 of the present invention. The control system consists of a position control circuit 60 to which a signal from the photocell 45 is applied. The control circuit 60 has a memory circuit, not shown, and which is obvious to a person skilled in the art, and controls the speed of the turret 30 by following the speed of the bag-forming film 28 via the tachometer 61. The operation of the system is actuated by the switch 62. The operation of the article transfer mechanism 30 is controlled by an automatic speed signal on the output line 63 of the position control circuit 60 which is transmitted after additionally processing a signal fed to it by a proximity sensor 64 associated with the turret transfer mechanism and which detects the position of the suction grasping elements 33. The output signal at output 63 is fed to a controller circuit 65 which controls the motor 66 thereby controlling the speed of operation of the turret mechanism. A reducer 67 couples the motor drive to the transfer mechanism 30. Accordingly, with the use of the photocell 45 which senses exact positions on the bag-forming film sheet, and the proximity sensor 64 which senses the position of the suction-grasping elements 33, it is possible to synchronize the speed of the films and the coupon transfer speed. With this apparatus, 200–300 coupons can be positioned every minute. The application of vacuum to the suction cups of the grasping elements is synchronized to the speed of the films. The fact that articles are positioned side by side in a staggered arrangement also permits the article insertion speed to be greatly increased.

As can be appreciated with the present invention, it is also possible to insert articles in transversely aligned relationship whereby two articles are positioned side by side, in a non-interfering manner, on the same bag-forming panel 10'. If this is desirable, each of the support rods 32 could be fitted with two suction grasping elements 33 and the nip roll 26 would be activated each time two coupons are deposited in the surfaces 42.

Briefly summarizing the operation of the present invention, a bag-forming film sheet 28 is fed to a nip roll 26 positioned at an article insertion station 24 and which is in frictional rotational contact with a support roll 27 over which an attaching film sheet 22 is guided for facial contact with the bag-forming film sheet 28. Articles 11, such as cards, coupons or flat packets, are then transferred from supply magazines 29 by the respective transfer mechanisms 30 to respective ones of two or more, herein two, article holding 14 surfaces 42. These surfaces are perforated vacuum surfaces capable of retaining an article 11 at a precise position as dictated by the position of the suction-grasping elements 33. These surfaces 42 are each positioned side by side and aligned with a distinct area or section of the bag-forming film sheet 28, as shown in FIGS. 5 and 6. The articles are supported on the surfaces 42 by vacuum with a leading edge 11' of the articles 11 being placed at a grasping position with a leading edge portion 11' of the article extending over a portion of the support roll 27. The nip roll 26 is then displaced over a grasping segment 27' of the support roll 27 in a direction towards the leading edge 11' of the article 11 to grasp the article and pull it between the bag-forming film sheet and the attaching film sheet along an associated one of the two distinct areas or sections 50 (see FIG. 1A) of the film sheet. The articles are then captive between the film sheets 22 and 28 and are secured by heat seals formed between the two film sheets. The film can then be fed to a supply roll for use on a bag-forming machine where a bag is then formed by a forming section of the machine (not shown).

It is also pointed out that the tension or pressure between the nip roll 26 and the support roll 27 can be adjusted by adjusting the tilt angle of the assembly 46'. It is also pointed out that for purpose of illustration, the vacuum chambers 41 are herein illustrated as being larger than they actually are and the relationship between the sealing devices 52 and the film support rolls 25 are of distorted proportions in these drawings. This is obvious when comparing the drawings of FIG. 1A with, for example, FIGS. 5 and 6.

As above described the present invention provides a plastic bag bundle 9, as shown in FIG. 2B, wherein the bundle is of substantially uniform thickness. This is accomplished by stacking the bags in an alternating sequence with coupons of adjacent bags being placed adjacent one another. Accordingly the problem of the prior art as illustrated in FIG. 2A is obviated. It is also pointed out that the bags may be positioned in alternating groups, i.e., two or three bags with coupons of each group offset from coupons of the adjacent groups. Accordingly, more bags can be held on the wicket pins 18 which means that the wicket pins need not be reloaded as frequently as with the prior art. Also, with the prior art the fact that the bottom portion of the bags flare outwardly, also results in machine malfunction and therefore it is necessary to stop the machine and realign the bags, and this is costly. The bags as specifically illustrated in FIG. 2B are formed with a wicket attaching panel 16' formed in the rear wall panel of the bag and extending above the mouth opening 16''. Holes 16''' are formed in the attaching panel for supporting the bag bundle on the wicket pins 18.

It is within the ambit of the present invention to cover any other obvious modifications not mentioned herein, provided such modifications fall within the scope of the appended claims.

We claim:

1. An apparatus for attaching flat articles, such as coupons, cards, packets, etc., to a plastic bag wall, said apparatus comprising a plurality of guide rolls and a nip roll for guiding and displacing a bag-forming film sheet of plastic material to an article insertion station, an article transfer mechanism having two or more article grasping means to grasp articles from a discharge end of a supply means and transfer same to two or more article holding means at said article insertion station, said article holding means being aligned with distinct sections of said bag-forming film sheet, a further plurality of guide rolls for guiding an attaching film sheet over a support roll positioned in frictional rotational contact with said nip roll at said insertion station with said attaching film sheet aligned with said distinct sections of said bag-forming film sheet, displaceable means for causing relative displacement between said support roll and said nip roll in a direction towards said article holding means to grasp a leading edge of an article positioned on each holding means and position same between said bag-forming film sheet and said attaching film sheet along one of said distinct sections, and sealing means to seal said bag-forming film sheet and said attaching film sheet together with said articles captive therebetween, said article holding means being a perforated support surface aligned side by side with each said distinct section of said bag-forming film sheet, said distinct sections being disposed longitudinally of said bag-forming film sheet one adjacent the other, a vacuum under said perforated surface, said articles being positioned on said surface with a leading edge portion thereof extending beyond said surface and over a portion of said support roll, said suction having a retention force inferior to the grasping force of said nip roll when displaced on said grasping segment to grasp said leading edge of said article.

2. An apparatus as claimed in claim 1 wherein there is further provided sensing means to sense a reference means on said bag-forming film sheet for actuating said displaceable means in synchronism with the speed of displacement of said bag-forming film sheet to position said articles at precise spaced intervals along said bag-forming film sheet.

3. An apparatus as claimed in claim 2 wherein said displaceable means is connected to said nip roll through pressure biasing means to cause said nip roll to travel forward and rearward to grasp said leading edge of said articles.

4. An apparatus as claimed in claim 3 wherein said pressure biasing means is comprised of a pair of arms secured each at a respective opposed end of a support shaft of said nip roll, said arms being constructed of flexible material to pressure bias said nip roll against said support roll.

5. An apparatus as claimed in claim 1 wherein said articles are positioned side by side along said first film sheet and between said bag-forming film sheet and said attaching film sheet, said articles being spaced laterally to lie in a side wall of adjacent bags formed from said bag-forming film sheet.

6. An apparatus as claimed in claim 1 wherein said articles are positioned side by side and in lateral alignment with one another between said bag-forming film sheet and said attaching film sheet, there being two articles secured side by side in a side wall of each bag formed from said bag-forming film sheet.

7. An apparatus as claimed in claim 1 wherein said sealing means comprises hot air sealing devices having sealing heads aligned with an outer surface of either said bag-forming film sheet or said attaching film sheet for forming a continuous heat seal to each side of said articles along the direction of travel of said bag-forming film sheet and at least one seal across said articles.

8. An apparatus as claimed in claim 1 wherein said article transfer mechanism is a turret mechanism mounted in planar alignment with said article holding means, said turret having four suction grasping elements each secured on a respective rotational shaft disposed on axes at 90° to one another, a drive for rotating said turret, control means associated with said sensing means for applying vacuum to said suction grasping elements when in position at said discharge end of said supply means to pick up a leading article and for disconnecting said vacuum at said holding means to release said article thereon at a precise position, said grasping elements being secured to said rotational shafts in an alternating offset manner to form two continuous series of grasping elements and aligned alternately with a respective on e of said two or more support surfaces, said supply means being comprised by two supply magazines each aligned with a respective one of said two continuous series of grasping elements.

9. An apparatus as claimed in claim 8 wherein said turret mechanism is provided with a planetary gear coupling to couple said rotational shafts to a turret support shaft, said drive being synchronized to the speed of said film shaft, said drive being synchronized to the speed of said film by a control circuit.

10. An apparatus as claimed in claim 8 wherein said articles are packages having at least a surface engageable by said suction grasping elements, said grasping elements having a suction cup defining a grasping head.

11. An apparatus as claimed in claim 1 wherein there is further provided means for forming a bag with said bag-forming film sheet with at least one of said articles secured thereto.

12. A method of attaching at least two flat articles, such as coupons, cards, packets, etc., to a plastic bag wall, said method comprising the steps of:

(i) displacing a bag-forming film sheet to an article insertion station;

(ii) transferring said articles in sequence from a supply means to two or more article holding means at said insertion station, said article holding means being aligned with distinct sections of said bag-forming film sheet;

(iii) guiding and displacing an attaching film sheet over a support roll positioned in frictional rotational contact with a nip roll at said insertion station with said attaching film sheet aligned with said distinct sections of said bag-forming film sheet, said bag-forming film sheet being in frictional engagement with said nip roll;

(iv) positioning one of said flat articles in alternating sequence over said one or more article holding means, said article holding means having a perforated surface;

(v) applying a vacuum under said perforated surface to create an article retention force on said perforated surface;

(vi) causing relative displacement between said nip roll and a support roll in a direction towards said two or more article holding means;

(vii) grasping a leading edge of an article positioned on one of said holding means by said nip roll and position same between said bag-forming film sheet and said attaching film sheet along one of said distinct sections, said article retention force being inferior to the grasping force of said nip roll;

(viii) sealing said article captive between said bag-forming film sheet and said attaching film sheet, and wherein said step (ii) comprises grasping an article from a discharge end of one of two article supply magazines by means of a suction holding means and transferring same to said article holding means where said article is precisely positioned thereon and released from said suction holding means, and held by said suction pressure in said article holding means.

13. A method as claimed iin claim 12 wherein there is further provided the step of sensing a reference means in said bag-forming film sheet for effecting said step (v) at a predetermined moment.

14. A method as claimed in claim 12 wherein said step (vi) comprises applying hot air sealing streams over one of said bag-forming film or attaching film sheets to seal said films together and to immobilize said article therebetween.

15. An apparatus for attaching flat articles, such as coupons, cards, packets, etc., to a plastic bag wall, said apparatus comprising a plurality of guide rolls and a nip roll for guiding and displacing a bag-forming film sheet of plastic material to an article insertion station, an article transfer mechanism having two or more article grasping means to grasp articles from a discharge end of a supply means and transfer same to two or more article holding means at said article insertion station, said article holding means being aligned with distinct sections of said bag-forming film sheet, a further plurality of guide rolls for guiding an attaching film sheet over a support roll positioned in frictional rotational contact with said nip roll at said insertion station with said attaching film sheet aligned with said distinct sections of said bag-forming film sheet, displaceable means for causing relative displacement between said support roll and said nip roll in a direction towards said article holding means to grasp a leading edge of an article positioned on each holding means and position same between said bag-forming film sheet and said attaching film sheet along one of said distinct sections, and sealing means to seal said bag-forming film sheet and said attaching film sheet together with said articles captive therebetween, said article holding means being a perforated support surface aligned side by side with each said distinct sections of said bag-forming film sheet, said distinct sections being disposed longitudinally of said bag-forming film sheet one adjacent the other, said article transfer mechanism being a turret mechanism mounted in planar alignment with said article holding means, said turret having four suction grasping elements each secured on a respective rotational shaft disposed on axes at 90° to one another, a drive for rotating said turret, control means associated with said sensing means for applying a vacuum to said suction grasping elements when in position at said discharge end of said supply means to pick up a leading article and for disconnecting said vacuum at said holding means to release said article thereon at a precise position, said grasping elements being secured to said rotational shafts in an alternating offset manner to form two continuous series of grasping elements and aligned support surfaces, said supply means being comprised by two supply magazines each aligned with a respective one of said two continuous series of grasping elements.

* * * * *